United States Patent [19]

Smithberg

[11] Patent Number: 4,551,918
[45] Date of Patent: Nov. 12, 1985

[54] HONEYCOMB CORE CUTTING TOOL AND METHOD OF USING

[75] Inventor: Dudley G. Smithberg, Auburn, Wash.

[73] Assignee: The Boeing Company, Seattle, Wash.

[21] Appl. No.: 592,774

[22] Filed: Mar. 26, 1984

[51] Int. Cl.[4] .................................... D27G 13/00
[52] U.S. Cl. .................................... 30/347; 144/219;
  144/220; 407/42; 407/51; 407/61; 408/227
[58] Field of Search .................... 30/276, 347, 355;
  408/227, 203.5; 407/114, 42, 51, 57, 61;
  144/218–220, 134 R

[56] References Cited

U.S. PATENT DOCUMENTS

| | | | |
|---|---|---|---|
| 2,317,262 | 4/1943 | Dugevoir | 407/42 X |
| 2,889,861 | 6/1959 | Kolimbat | 144/219 |
| 3,358,720 | 12/1967 | Henderson | 407/51 |
| 4,133,361 | 1/1979 | Martinu | 144/134 R X |
| 4,248,553 | 2/1981 | Uraemer | 407/114 |
| 4,252,481 | 2/1981 | Virieg | 407/57 X |

Primary Examiner—Douglas D. Watts
Attorney, Agent, or Firm—Morris A. Case; B. A. Donahue; Nicolaas DeVogel

[57] ABSTRACT

A set of two cutting units are located on the end of a tool to be rotated. The cutting units are radially aligned and on a bevel. Each blade on each cutting unit has a radial rake of at least 60 degrees, a clearance angle, and serrations cut at an angle normal to the cutting edge to provide a series of points extending along that cutting edge.

2 Claims, 8 Drawing Figures

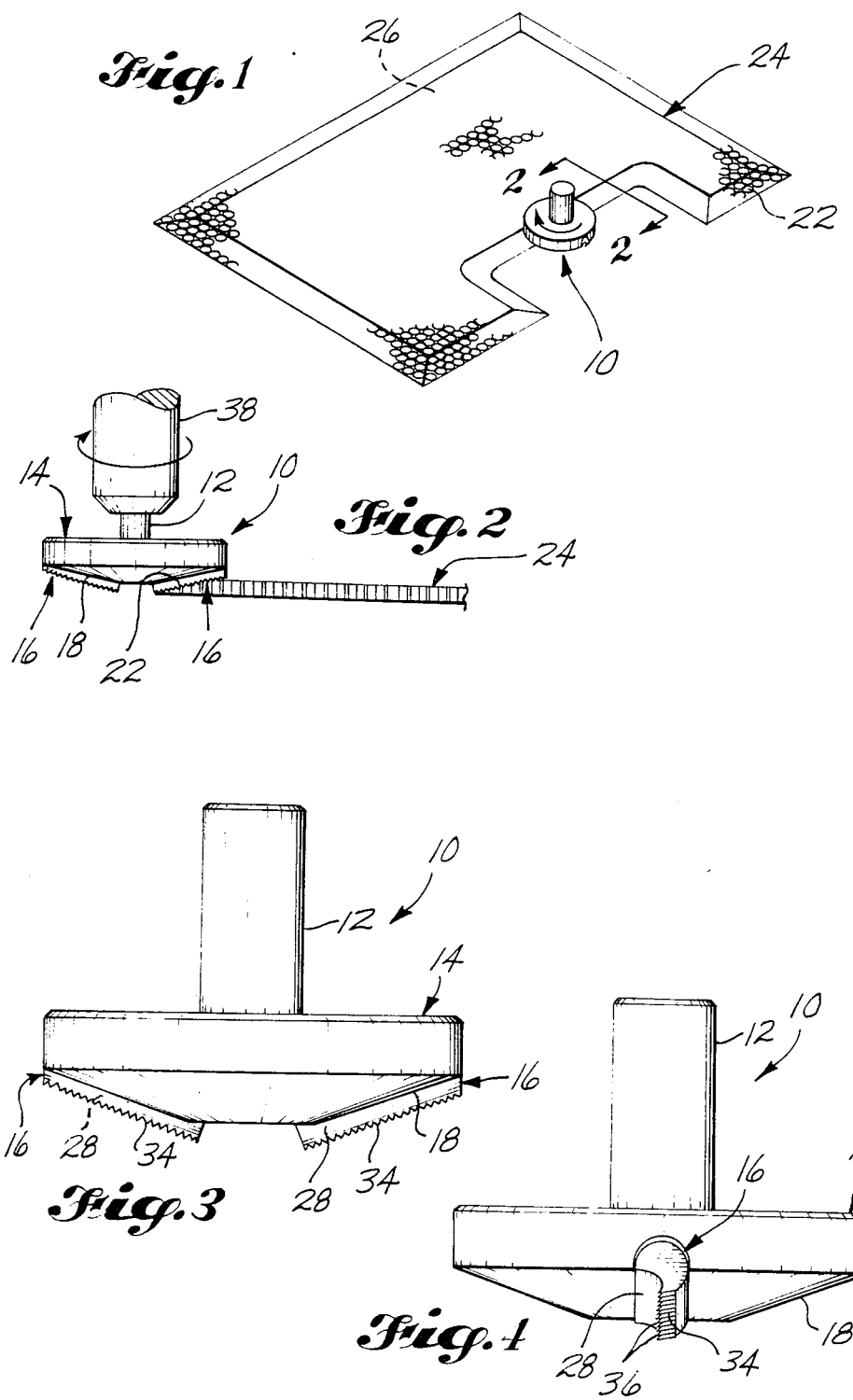

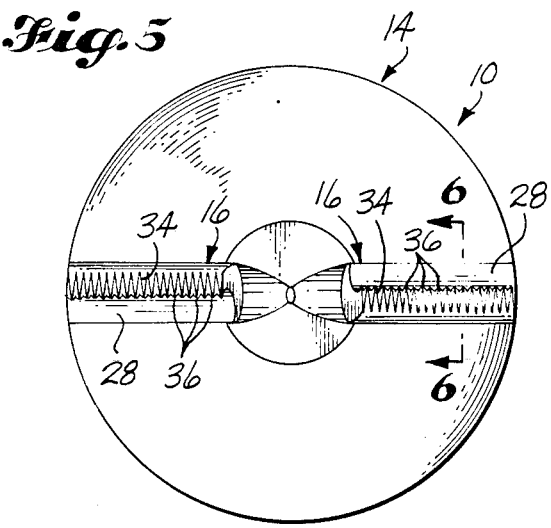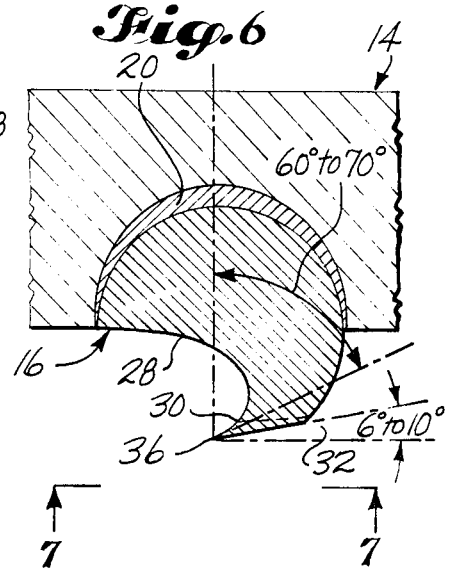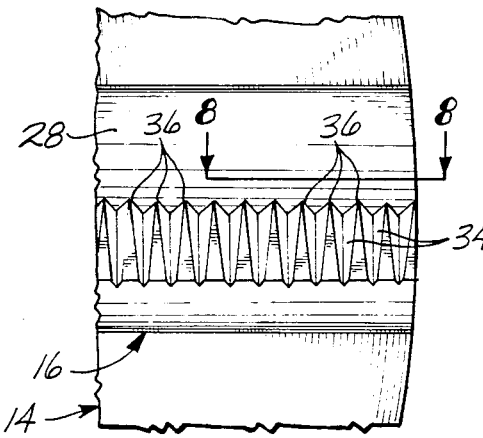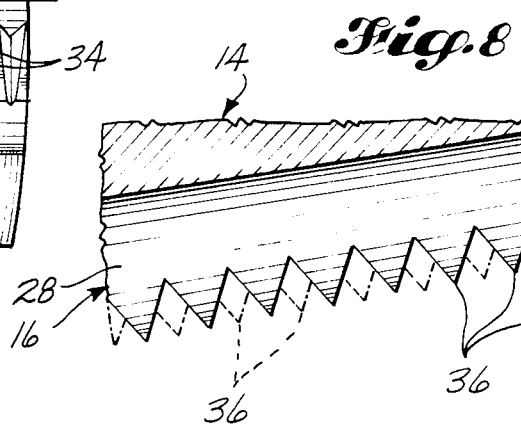

HONEYCOMB CORE CUTTING TOOL AND METHOD OF USING

BACKGROUND OF THE INVENTION

Plastic honeycomb core material is used extensively in aircraft structures due to its high strength and light weight. Many of the details made from this core require that the edges be chamfered. This forming is currently produced by hand held tools utilizing abrasive discs. This method is labor intensive and relies upon operator skill to produce dimensionally accurate parts. Various cutters have been tried to accomplish this contoured trimming but all the cutters tear the surface and leave a part that is ragged and heavily burred. It was found that the cutter of this invention leaves a burrless surface that does not require a subsequent abrading operation.

SUMMARY OF THE INVENTION

This cutter has a pair of matching, but uniformly offset, aligned radially directed cutting units. A series of cutting points are located along a line in each cutter to make up the cutting edge, and act to pierce instead of to cut in the normal manner.

It is an object of this invention to provide a unit that pierces then removes plastics along a line to effect cutting of the plastic.

It is another object of this invention to provide a cutter that cleanly removes material from a plastic part to provide a burrless surface.

DESCRIPTION OF THE DRAWINGS

FIG. 1 shows a perspective view of the cutter of this invention in use.

FIG. 2 shows a cross sectional view taken along line 2—2 of FIG. 1.

FIG. 3 shows an enlarged side elevational view as in FIG. 2, but of the cutter only.

FIG. 4 shows the view as in FIG. 3, but with the cutter rotated 90 degrees.

FIG. 5 shows an enlarged end view of the cutter.

FIG. 6 shows an enlarged cross sectional view taken along line 6—6 of FIG. 5.

FIG. 7 shows the view taken along line 7—7 of FIG. 6.

FIG. 8 shows an enlarged view taken along the line 8—8 of FIG. 7 with phantom lines showing the offset between the two cutters.

DETAILED DESCRIPTION

The cutting tool 10, has a shank 12, a base 14, and a pair of cutting units 16. The shank is preferrably integral with the base. The base or body is of a high grade tool steel. It is cylindrical in shape and the outer end is bevelled at 18. The cutting units are of a prepared material such as high speed steel or tungsten carbide. The cutting units are secured to the base by any known means such as by silver soldering 20. These cutting units are aligned with respect to each other, extend radially and are placed on the bevel established by the base. The angle of the bevel is preferably selected such that the cutters provide the desired chamfer 22, on a part 24, to be formed when the tool is aligned normal to the base 26 of the part.

The face 28, of each cutting unit 16, has a radial rake 30, of about 60 to 70 degrees, with a 70 degree rake preferred. The cutting unit has a clearance angle 32, of about 6 to 10 degrees with about 10 degrees preferred. The cutting units are each serrated at 34, and is best shown in FIGS. 7 and 8. The serrations are cut normal to and extend along the length of the cutting unit. The combination of the radial rake, the clearance angle, and the serrations create a series of pointed teeth 36 that extend along the cutter and act as the cutting edge. The number of teeth along the serrated length varies from about 10 to 20 per inch of length with about 20 teeth per inch preferred. The cutting units are both shaped exactly alike, however, they are equally offset with respect to each other so that the teeth of one unit strikes a part to be trimmed at the midpoint between the teeth of the other unit as is shown in FIG. 8. In that Figure the location of the second unit with respect to the first unit is shown in phantom.

In operation the shaft 12, is clamped in a chuck 38 of a machine, not shown, that drives the cutting tool 10. The tool can be set at an angle to machine the top surface of a formed plastic part or it can be mounted as shown in FIGS. 1 and 2 to effect a chamfer. This tool may be used on any plastic or reinforced plastic part, and it also may be used on a formed plastic honeycomb part 24, as is shown in FIG. 1. The cutting tool is preferrably rotated at about 14,000 to about 19,000 r.p.m. and the points 36, act to pierce and remove the plastic to provide a burrless surface.

I claim:

1. A cutting tool for shaping formed plastics comprising: a shank, a cylindrical base having a tapered outer end, a pair of aligned radially extending cutting units along the tapered outer end of the base with each cutting unit having means for piercing and removing material including piercing cutting points for piercing and removing material from a formed plastic part, spacing between piercing points on each of the two cutting units are matching but uniformly offset with respect to each other to provide a burrless machined surface when the cutting tool is used on the formed plastic, and the means for piercing and removing material from the plastic part comprises: each cutting unit having a radial rake of at least 60 degrees, a clearance angle, and serrations normal to and extending along the length of the cutting unit.

2. A cutting tool for shaping formed plastics as in claim 1 wherein the radial rake is between 60 degrees and 70 degrees, the clearance angle is between 6 and 10 degrees, and the serrations on each cutting unit range between 10 and 20 serrations per inch.

* * * * *